United States Patent [19]
Demo et al.

[11] Patent Number: 5,821,641
[45] Date of Patent: Oct. 13, 1998

[54] SECONDARY SUPPLY POWER REFERENCED INTERLOCK CIRCUIT

[75] Inventors: Frank J. Demo, Tomball, Tex.; Edward R. Stanford, Olympia, Wash.

[73] Assignee: Compaq Computer Corp., Houston, Tex.

[21] Appl. No.: 690,640

[22] Filed: Jul. 30, 1996

[51] Int. Cl.$^6$ ................................................ H01H 35/00
[52] U.S. Cl. .................... 307/125; 307/126; 307/139; 307/140; 361/193; 364/492; 364/273.5; 395/280; 395/311
[58] Field of Search ................................. 307/38, 39, 85, 307/86, 119, 125, 126, 139, 140; 361/192, 193; 364/492, 273.5, 948.4, 948.91; 395/280, 283, 311, 750, 200.02

[56] References Cited

U.S. PATENT DOCUMENTS

| | | | |
|---|---|---|---|
| 3,597,737 | 8/1971 | Wallace, Jr. | 361/192 |
| 3,946,287 | 3/1976 | Hopkins | 361/193 |
| 4,206,443 | 6/1980 | Britton | 307/139 |
| 4,507,703 | 3/1985 | Blau et al. | 361/193 |
| 4,673,828 | 6/1987 | Marlow | 307/139 |
| 4,724,505 | 2/1988 | Gelbort | 361/192 |
| 5,008,846 | 4/1991 | Inoue | 364/707 |
| 5,077,631 | 12/1991 | Cleary | 361/192 |
| 5,463,261 | 10/1995 | Skarda et al. | 395/283 |
| 5,542,049 | 7/1996 | Kurokawa et al. | 395/280 |
| 5,619,076 | 4/1997 | Layden et al. | 307/139 |
| 5,627,416 | 5/1997 | Kantner | 395/283 |

*Primary Examiner*—William M. Shoop, Jr.
*Assistant Examiner*—Peter Ganjian
*Attorney, Agent, or Firm*—Jenkens & Gilchrist

[57] ABSTRACT

A device for enabling and disabling the supply of power from a power source to a computer, the power source having a primary side and a secondary side, the device including an interlock switch connected to the computer, the interlock switch selectably positionable between open and closed positions; and two optocouplers coupled in parallel, both of which are referenced to the secondary side of the power source. When the interlock switch is closed, the first optocoupler is active. This enables the supply of power from the power source to the computer. When the interlock switch opens, the first optocoupler shuts off. This disables the supply of power from the power source to the computer. Further when the interlock switch is opened, the second optocoupler is saturated. This overrides the regulation feedback circuitry from regulating the power supplied by the power source driving the power outputted to the computer to zero. When the interlock switch is closed, the second optocoupler operates in the linear region. This enables the regulation feedback circuitry to regulate the power supplied by the power source to the computer.

17 Claims, 2 Drawing Sheets

SECONDARY SUPPLY POWER REFERENCED INTERLOCK CIRCUIT

FIELD OF THE INVENTION

This invention relates to computer chassis interlock circuits, and more particularly, to a safety interlock circuit for safely disconnecting the power source of a computer system, with a secondary side referenced interlock circuit.

BACKGROUND OF THE INVENTION

In computer systems utilizing power supplies capable of providing hazardous energies, which is often defined as anything greater than 240VA, it is highly desirable that the computer housing or enclosure be designed to prevent a user from coming into contact with conductors or surfaces that are connected to an output. Current technologies utilize interlock circuits that shut down the power supply when an attempt is made by the user to enter the chassis, such as when an access panel is opened. These interlock circuits are normally referenced to the main primary supply of the power supply. Further, these interlock circuits must meet certain requirements of single component fault tolerance and reliability. Meeting the requirements for single component fault tolerance is particularly difficult.

Many of the current technologies meet the interlock requirements by placing a two pole switch in the AC line input. Therefore, each of these interlock switches must carry full line current and voltage. Because of this, most of the interlock switches are large and expensive. The interlocking of multiple panels requires multiple interlock switches and complex AC line wiring or complex mechanical arrangements to connect one switch to all the panels. If low voltage primary interlocks are used, the switch requirement is less stringent. However, double insulated wire must still be used to connect these switches. Double insulated wiring for these low voltage primary switches is expensive and very cumbersome to route to multiple panels. As can be appreciated, the above described are just a few of the problems with current technologies of interlock circuits.

SUMMARY OF THE INVENTION

The present invention overcomes the above identified problems as well as other shortcomings and deficiencies of existing technologies by providing a low cost secondary side referenced interlock circuit.

In particular the present invention provides an interlock system for connecting and disconnecting the supply of power from a power source to a computer, the power source having a main primary supply and a main secondary supply. The interlock system includes an interlock switch connected to the computer, which is selectably positionable between open and closed positions. The interlock system further includes two optocouplers coupled in parallel, both of which are referenced to the secondary supply of the power source. When the interlock switch closes, the first optocoupler becomes active, enabling the power source to supply power to the computer. When the interlock switch is opened, the first optocoupler shuts off, disconnecting the power source out of connection with the computer. Further when the interlock switch is opened, the second optocoupler saturates, overriding regulation feedback circuitry to the power source. The regulation feedback circuitry regulates the power supplied by the power source to the computer. When the interlock switch is closed, the second optocoupler operates in a linear mode enabling the regulation feedback circuitry with the power source.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION

Figure 1:
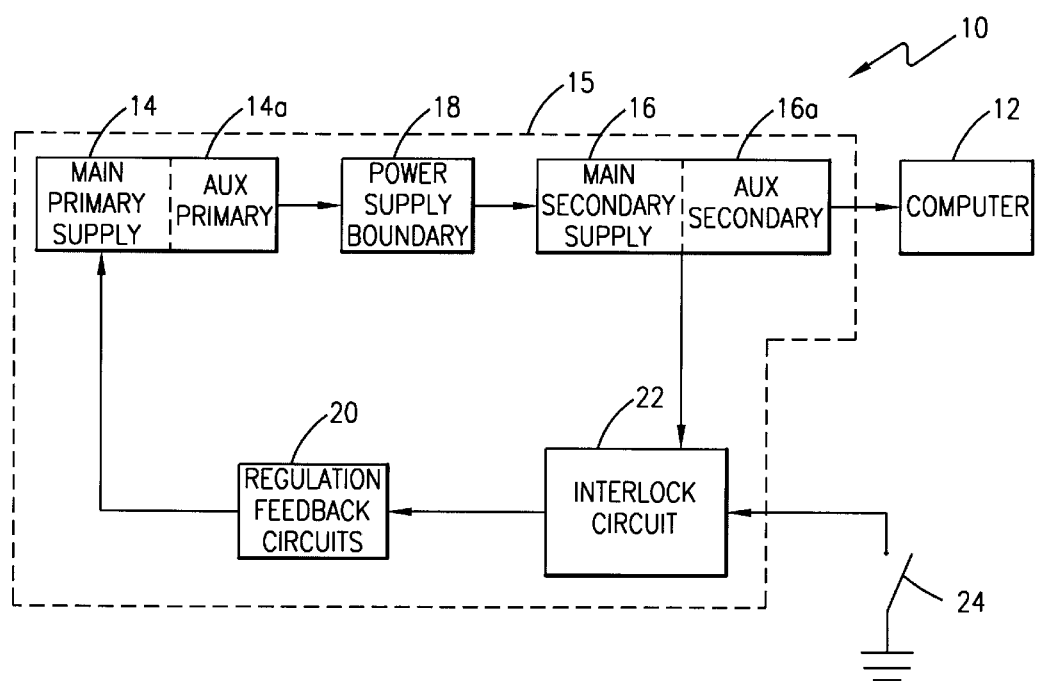
FIG. 1 is a functional block diagram of a computer system utilizing the present invention.

Referring now to FIG. 1, there is illustrated a block diagram of a computer system 10 utilizing the present invention. As depicted computer system 10 includes a computer 12, a power supply 15 including a main primary supply 14 and an auxiliary primary 14a, a main secondary supply 16, and an auxiliary secondary 16a, a primary/secondary power supply boundary 18, regulation feedback circuits 20, interlock circuit 22, and a switch 24.

As depicted interlock circuit 22 is coupled to switch 24, main secondary supply 16, and is further coupled to the main primary supply 14 of power supply 15 through regulation feedback circuits 20. Main primary supply 14 is further coupled to main secondary supply 16 through primary/secondary power supply boundary 18. Main primary supply 14 and main secondary supply 16 of power supply 15 provide the power to computer 12.

Switch 24, which is referenced to the secondary supply, is generally a mechanical interlock switch which can be attached at various locations in the computer system 10, such as to a removable computer component module, a removable computer chassis panel, or an access door.

Computer system 10 is powered by main primary supply 14 and main secondary supply 16 of power supply 15. Main primary supply 14 and main secondary supply 16 provide the high input AC current to corresponding components of computer 12, (for example 3 volts at 30 amps, 5 volts at 40 amps and 12 volts at 27 amps). The auxiliary primary 14a controls the PWMs of the primary side of power supply 15. The auxiliary secondary 16a provides low voltage/low current to interlock circuit 22 and also generally powers the low power "housekeeping" devices of computer 12, such as an on-board clock or static RAM.

The primary/secondary power supply boundary 18 is an isolation space separating the main primary supply 14 from the main secondary supply 16 of power supply 15. Regulation feedback circuits 20 maintains and regulates the power supplied by power supply 15, to computer 10 according to selected power supply specifications.

In general operation, when switch 24 is closed, the main primary supply 14 and the main secondary supply 16 of power supply 15 provide power to computer 12. When switch 24 is opened, interlock circuit 22 interfaces with regulation feedback circuits 20 to force the primary side supply 14 to power down, and further immediately drains current to the circuits powered by the main primary supply 14. Interlock circuit 22 also shuts off the main secondary supply 16. A more detailed description of the operation of interlock circuit 22 is given below.

Figure 2:
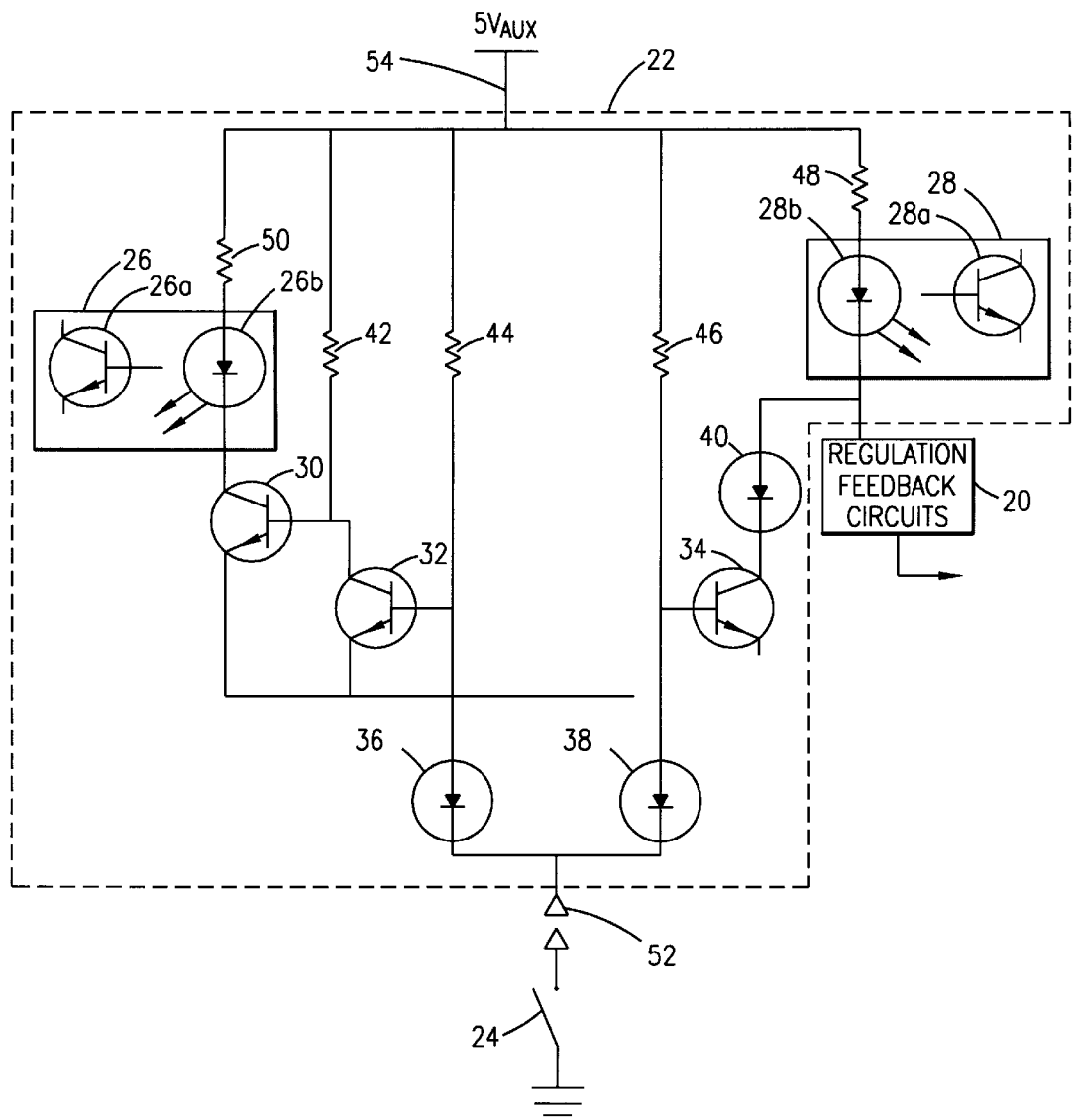
FIG. 2 is a detailed schematic diagram of the present invention.

Referring now to FIG. 2, there is illustrated a more detailed schematic of interlock circuit 22 as shown in FIG. 1. As depicted interlock circuit 22 includes optocouplers 26 and 28, transistors 30, 32 and 34, diodes 36, 38 and 40, resistors 42, 44, 46, 48 and 50, and an interlock output pin 52. Optocoupler 26 includes an LED 26b and a transistor 26a, which is responsive to LED 26b. Likewise optocoupler 28 includes an LED 28b and a transistor 28a, which is responsive to LED 28b. Optocoupler 26 crosses the primary/secondary power supply boundary 18 and supplies operating power to the primary control circuits in computer 12. Optocoupler 28 crosses the primary/secondary power supply boundary 18 and conveys the regulation feedback to a primary pulse width modulator (PWM) which is used to transfer power from the main primary supply 14 to the main secondary supply 16. Power is also supplied to interlock circuit 22 at input 54 from auxiliary secondary 16a. Interlock output pin 52 is an interface pin used in hot-pluggable type components, such as power supplies. The pins of interlock output pin 52 must be interconnected for operation of the component to occur.

Although good results have been achieved in integrating interlock circuit 22 within power supply 15, it is contemplated to be within the scope of this invention that interlock circuit 22 could also be implemented external to power supply 15.

In operation, it will first be assumed that switch 24 is closed and that computer 12 is being supplied power by main primary supply 14 and main secondary supply 16. When the switch 24 is closed, transistors 32 and 34 are off and transistor 30 is on. The current through resistor 46 will be shunted through switch 24. Accordingly, optocoupler 28 is operating in a normal fashion with the regulation feedback circuits 20. As soon as switch 24 is opened, resistor 46 will bias transistor 34 on, pulling current through diode 40, thereby turning optocoupler 28 on hard. This will cause regulation feedback circuits 20 to be overridden, and immediately drive down the output voltage and the power from main primary supply 14 and main secondary supply 16.

As discussed above, when switch 24 is closed, diode 36 is will be biased on, transistor 32 will be off, and resistor 42 will bias up transistor 30, turning transistor 30 on. This will pull current through optocoupler 26 turning on transistor 26a of optocoupler 26. This allows power to be applied to corresponding circuitry in computer 12 from power supply 15. When switch 24 is opened, diode 36 will shut off, resistor 44 will bias transistor 32 on, removing the bias from transistor 30, and subsequently turning off transistor 30. This stops current flowing through LED 26b of optocoupler 26, turning off transistor 26a, and optocoupler 26. This powers down auxiliary primary 14a thereby removing the "housekeeping power" from the primary PWMs.

As described above, when computer system 10 is powered up and switch 24 is closed, optocoupler 26 is conducting power, and optocoupler 28 is operating in a normal fashion. When switch 24 is opened, optocoupler 28 is on, while optocoupler 26 switches off.

With optocouplers 26 and 28 being coupled in parallel, if one of the optocouplers fails, the parallel path through the other optocoupler circuit will still provide the desired power down when switch 24 is opened. For example, if optocoupler 28 fails to saturate when switch 24 is opened, optocoupler 26 will still shut down power supply 15. However, the regulation feedback circuits would not drive down the power as fast. It would generally take the standard amount of discharge time to completely power down. Similarly, if optocoupler 26 would fail to shut off when switch 24 is opened, optocoupler 28 will turn on, and still power down computer system 10.

The advantages of the present invention are clear. First, because the pull-ups are biased by auxiliary secondary 16a in interlock circuit 22, the wiring to connect the present invention in a computer chassis only needs to meet SELV spacing and insulation requirements. Further the secondary side referenced interlock circuit allows for small low cost switches to be placed on each panel of the enclosure of computer system 10. The secondary referenced wiring is small, low cost and can be routed to any panel that needs interlocking. Multiple switches can also be placed in series to interlock multiple panels of computer system 10. A further advantage of the present invention results from the parallel configuration of optocouplers 26 and 28 in interlock circuit 22. The redundant shutdown paths described above overcome the need for redundant additional optocouplers and further meet the single component fault tolerant requirements.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer system having a device for enabling and disabling the supply of power from a power source to a computer, the power source having a primary side and a secondary side, said device comprising:

an interlock switch connected to the computer, said interlock switch selectably positionable into a first and a second position;

a first switching device coupled to the secondary side of the power source, said first switching device having a first and second operating mode;

said first switching device, when in said first operating mode, for enabling the power source to supply power to the computer, and when in the second operating mode, for disabling the power source from supplying power to the computer, said first switching device is in said first operating mode when said interlock switch is positioned in said first position, and said first switching device is in said second operating mode when said interlock switch is positioned in said second position;

a second switching device coupled to the secondary side of the power source and coupled in parallel with said first switching device, said second switching device having a first and a second operating mode;

a regulator coupled to the power source, said regulator for regulating the power supplied by the power source to the computer; and said second switching device, when in said first operating mode for enabling said regulator to regulate the power supplied by the power source, and when in said second operating mode, for overriding said regulator from regulating said power source, said second switching device is in said first operating mode when said interlock switch is positioned in said first position, and said second switching device is in said second operating mode when said interlock switch is positioned in said second position.

2. The device as recited in claim 1, wherein said first switching device includes an optocoupler.

3. The device as recited in claim 2, wherein said optocoupler includes a light emitting diode coupled to the secondary side of the power source and a transistor coupled to the primary side of the power source, said transistor being responsive to said light emitting diode.

4. The device as recited in claim 1, wherein said second switching device includes an optocoupler.

5. The device as recited in claim 1, further comprising a biasing circuit coupled between said first switching device and said interlock switch, said biasing circuit for changing said first switching device between said first and second operating modes in response to said interlock switch being switched between said first and second positions.

6. The device as recited in claim 4, wherein said optocoupler includes a light emitting diode coupled to the secondary side of the power source and a transistor coupled to the primary side of the power source, said transistor being responsive to said light emitting diode.

7. A device for enabling and disabling the supply of power from a power source to an electronic system, the power source having a primary side and a secondary side, said device comprising:

an interlock switch connected to the electronic system, said interlock switch selectably positionable into a first and a second position;

a first switching device coupled to the secondary side of the power source, said first switching device having a first and second operating mode;

said first switching device, when in said first operating mode, for enabling the power source to supply power to the electronic system, and when in the second operating mode, for disabling the power source from supplying power to the electronic system, said first switching device is in said first operating mode when said interlock switch is positioned in said first position, and said first switching device is in said second operating mode when said interlock switch is positioned in said second position;

a second switching device coupled to the secondary side of the power source and coupled in parallel with said first switching device, said second switching device having a first and a second operating mode;

a regulator coupled to the power source, said regulator for regulating the power supplied by the power source to the electronic system, and said second switching device, when in said first operating mode for enabling said regulator to regulate the power supplied by the power source, and when in said second operating mode, for overriding said regulator from regulating the power supplied by the power source, said second switching device is in said first operating mode when said interlock switch is positioned in said first position, and said second switching device is in said second operating mode when said interlock switch is positioned in said second position.

8. The device as recited in claim 7, wherein said first switching device includes an optocoupler.

9. The device as recited in claim 8, wherein said optocoupler includes a light emitting diode coupled to the secondary side of the power source and a transistor coupled to the primary side of the power source, said transistor being responsive to said light emitting diode.

10. The device as recited in claim 7, wherein said second switching device includes an optocoupler.

11. The device as recited in claim 10, wherein said optocoupler includes a light emitting diode coupled to the secondary side of the power source and a transistor coupled to the primary side of the power source, said transistor being responsive to said light emitting diode.

12. The device as recited in claim 7, further comprising a biasing circuit coupled between said first switching device and said interlock switch, said biasing circuit for changing said first switching device between said first and second operating modes in response to said interlock switch being switched between said first and second positions.

13. An access interlock system for enabling and disabling the supply of power from a power source to the components of a computer housed within a chassis, the power source having a primary side and a secondary side, said interlock system comprising:

a switch electrically coupled to the components of the computer and connected to the chassis, said switch selectably positionable into a first and a second position;

a first switching device coupled to the secondary side of the power source, said first switching device having a first and second operating mode; and said first switching device, when in said first operating mode, for enabling power to be supplied from the power source to the components of the computer, and when in the second operating mode, for disabling the supply of power from the power source to the components of the computer, said first switching device is in said first operating mode when said switch is positioned in said first position, and said first switching device is in said second operating mode when said switch is positioned in said second position.

14. The interlock system as recited in claim 13, and further comprising:

a second switching device coupled to the secondary side of the power source and coupled in parallel with said first switching device, said second switching device having a first and a second operating mode;

a regulator coupled to the power source, said regulator for regulating the power supplied by the power source to the components of the computer, and said second switching device, when in said first operating mode for enabling said regulator to regulate the power supplied by the power source, and when in said second operating mode, for overriding said regulator from regulating the power supplied by the power source, said second switching device is in said first operating mode when said switch is positioned in said first position, and said second switching device is in said second operating mode when said switch is positioned in said second position.

15. The device as recited in claim 14, wherein:

said first switching device includes an optocoupler; and said optocoupler of said first switching device including a light emitting diode coupled to the secondary side of the power source and a transistor coupled to the primary side of the power source, said transistor being responsive to said light emitting diode.

16. The device as recited in claim 15, wherein:

said second switching device includes an optocoupler; and said optocoupler of said second switching device includes a light emitting diode coupled to the secondary side of the power source and a transistor coupled to the primary side of the power source, said transistor being responsive to said light emitting diode.

17. The device as recited in claim 16, further comprising a biasing circuit coupled between said first switching device and said switch, said biasing circuit for changing said first switching device between said first and second operating modes in response to said switch being switched between said first and second positions.

* * * * *